United States Patent [19]

Culhane et al.

[11] 4,141,098
[45] Feb. 27, 1979

[54] HONEY SUPER

[75] Inventors: Vernon C. Culhane, 2729 CR 228; Danny F. Culhane, 300 Waters Way, CR 228, both of Durango, Colo. 81301

[73] Assignees: Vernon C. Culhane; Danny F. Culhane, both of Durango, Colo.

[21] Appl. No.: 724,530

[22] Filed: Sep. 20, 1976

[51] Int. Cl.² ............................................. A01K 47/02
[52] U.S. Cl. ................................................ 6/2 R; 6/10
[58] Field of Search .................... 6/1 R, 2 R, 2 A, 10, 6/11

[56] References Cited

U.S. PATENT DOCUMENTS

| | | | |
|---|---|---|---|
| 89,644 | 5/1869 | Finley | 6/2 A |
| 557,532 | 4/1896 | Aldrich | 6/2 A |
| 747,055 | 12/1903 | Feldmann | 6/10 |
| 1,426,551 | 8/1922 | Cress | 6/11 |
| 2,474,382 | 6/1949 | Smith et al. | 6/10 |
| 3,071,784 | 1/1963 | Kolb | 6/1 |
| 3,088,135 | 5/1963 | Covington | 6/10 |
| 3,579,676 | 5/1971 | Pierce | 6/2 A |

FOREIGN PATENT DOCUMENTS

| | | | |
|---|---|---|---|
| 333980 | 3/1921 | Fed. Rep. of Germany | 6/2 R |
| 995674 | 1951 | France | 6/10 |
| 607170 | 1960 | Italy | 6/2 R |
| 166286 | 1959 | Sweden | 6/2 A |

*Primary Examiner*—Clyde I. Coughenour
*Attorney, Agent, or Firm*—Clarence A. O'Brien; Harvey B. Jacobson

[57] ABSTRACT

A honey super has a pair of opposing end walls each provided with a socket disposed directly opposite the socket provided in the other of the end walls. A bar is disposed in the sockets so as to support a comb foundation of a frame disposed in the super, with the foundation being attached to the end walls of the super in such a manner that the end walls of the super partially form the frame. By increasing the number of sockets, any desired number of frames can be arranged in the honey super, space permitting.

8 Claims, 4 Drawing Figures

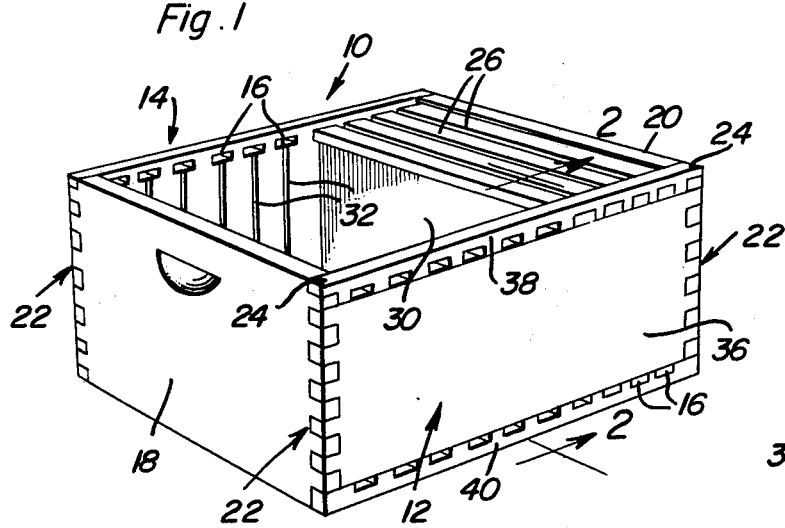
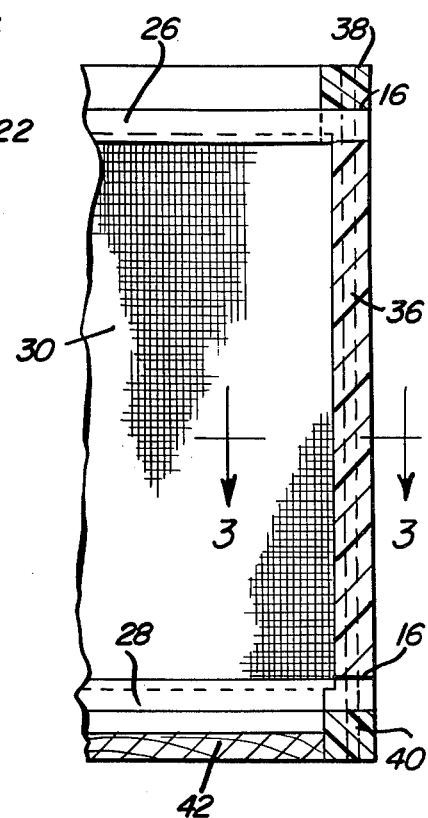
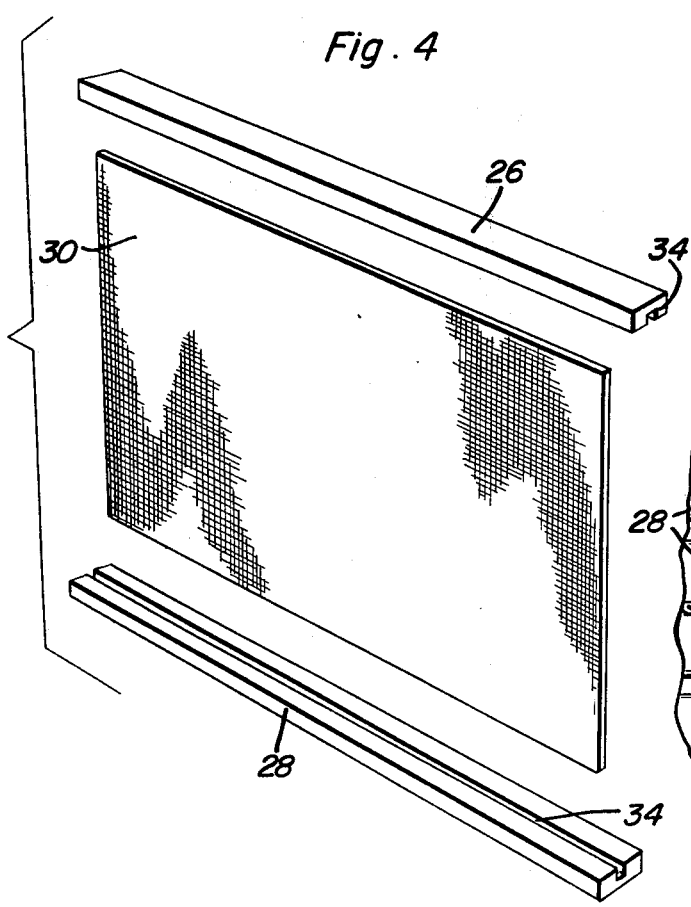
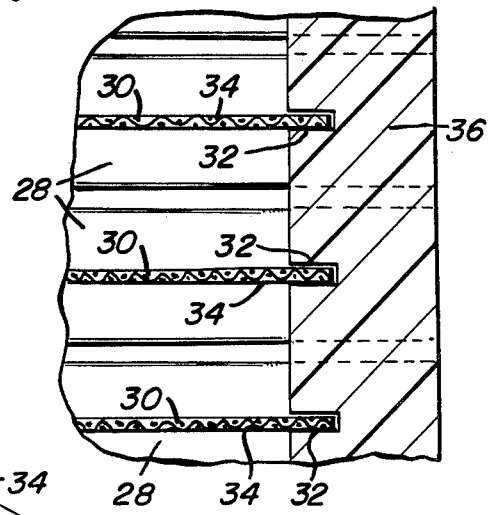

HONEY SUPER

BACKGROUND OF THE INVENTION

1. Field of the Invention

This invention relates generally to honey supers, and particularly to a honey super construction wherein the comb frames are integral with the framework of the honey super.

2. Description of the Prior Art

The terms "honey super" and "hive body" are used by beekeepers to designate sections of a beehive that can be added to or subtracted from a bee colony as space requirements for the bees and/or the storage of honey dictates. The sections at the bottom of the bee colony where the bees have their nest is usually known as a hive body, while those on top of the hive body in which the honey is stored are generally referred to as honey supers.

The hive body or bodies containing the brood nest of the bees must have removable combs so that conditions in the nest can be readily examined. There are situations, however, where solid or unmovable combs could be of advantage in a honey super. Further, the advent of synthetic resins permits molding of certain complex parts usable in honey supers and hive bodies in an economical manner not previously achievable.

U.S. Pat. Nos. 3,110,044, issued Nov. 12, 1963 to W. Dullas, and 3,579,676, issued May 25, 1971 to P. W. Pierce, disclose beehive sections which are molded from a suitable synthetic resin. These known molded hive sections, however, are intended to take conventional comb frames such as those shown in U.S. Pat. No. 3,579,676 and as also set forth in U.S. Pat. Nos. 1,282,645, issued Oct. 22, 1918 to E. L. Sechrist; 1,239,536, issued Sept. 11, 1917 to F. W. Summerfield; 2,591,328, issued Apr. 1, 1952 to J. Yanik; 2,604,643, issued July 29, 1952 to R. P. Hamilton; and 3,231,907, issued Feb. 1, 1966 to W. Z. Covington. These known frames generally consist of a substantially rectangular frame with a pair of trunnion-like extensions on an uppermost portion of the frame in order to engage suitable abutments provided in the hive section. A comb foundation which may be a suitable wire or synthetic mesh, and the like, is affixed to the frame, although it is possible to provide a molded frame as disclosed in U.S. Pat. No. 2,591,328 in which recesses of predetermined configuration are provided in order to mold the honey in such a configuration directly in the comb.

SUMMARY OF THE INVENTION

It is an object of the present invention to provide a construction for honey supers which is less expensive and requires fewer parts than conventional honey supers.

It is another object of the present invention to provide a honey super which is easier to handle and facilitates the honey extraction process when compared to conventional honey supers.

It is still another object of the present invention to provide a honey super wherein the comb frames can be constructed integral with the outer framework of the honey super.

It is yet another object of the present invention to provide a honey super which takes advantage of synthetic resin molding techniques to simplify construction of the honey super.

These and other objects are achieved according to the present invention by providing a honey super having: a pair of opposing end walls each provided with a socket disposed directly opposite the socket provided in the other of the end walls; a pair of side walls connected to and extending between the end walls so as to form a substantially rectangular framework; a bar disposed in and extending between the sockets in order to partially form a comb frame disposed in the super; and a comb foundation attached to the bar and to the end walls of the super, the end walls partially forming the comb frame.

Preferably, each of the end walls is provided with at least one set of two sockets disposed in a plane substantially parallel to the side walls of the super. Two bars, one a top bar and the other a bottom bar are disposed in the sockets and attached to the comb foundation.

While the end walls of the honey super may be fabricated as a single piece, an advantageous feature of the present invention provides that one of the end walls be constructed in sections, with a main portion having removably mating therewith parallel strips disposed bracketing the main portion and provided with recesses that cooperate with an edge of the main portion against which the associated strip abuts to form the sockets of the end wall. In this manner, the top and bottom bars of the frames of the super may be easily installed and removed by removal and replacement of the bracketing strips. Alternatively, one of the end walls of the super can be connected to the associated side walls in such a manner as to be easily and readily removable in order to permit insertion and removal of the top and bottom bars of the comb frames.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing a honey super according to the present invention, but with several of the comb frames removed.

FIG. 2 is an enlarged, fragmentary, sectional view taken generally along the line 2—2 of FIG. 1.

FIG. 3 is a fragmentary, sectional view taken generally along the line 3—3 of FIG. 2.

FIG. 4 is an exploded perspective view showing the elements which cooperate with the end walls of a honey super according to the present invention in order to form a comb frame.

DESCRIPTION OF THE PREFERRED EMBODIMENTS

Referring now more particularly to FIGS. 1 through 3 of the drawing, a honey super 10 according to the invention includes a pair of opposed end walls 12 and 14 each provided with a plurality of sockets 16 disposed directly opposite a like number of sockets 16 provided in the other of the end walls 12, 14. More specifically, the sockets 16 are divided into a plurality of sets of two sockets each disposed in a plane substantially parellel to a pair of also substantially parallel planar side walls 18 and 20. Side walls 18 and 20 are connected to and extend between end walls 12 and 14 and are connected thereto in a suitable manner, such as by the notched butt joints 22, to form a generally rectangular framework.

Pins 24 can be inserted in appropriate apertures provided in a pair of the butt joints 22 in order to releasably retain an end wall 12 on the side walls 18 and 20. Although a pinned notched butt joint is shown in FIGS. 1 through 3, it is to be understood that other forms of joints appropriate to the situation can be employed as desired.

Referring now to FIG. 4 in conjunction with FIGS. 1 through 3, a pair of bars 26 and 28, one being a top bar and the other a bottom bar, are disposed in and extend between opposed sockets 16 and are attached to a suitable comb foundation 30. This foundation is of conventional construction, and accordingly the construction of foundation 30 will not be described herein. Further, although the manner of attachment of the foundation 30 to bars 26, 28 and to the end walls 12 and 14 may constitute any suitable, known attachment technique, a preferred manner is to utilize grooves 32 and 34. Wire, clips, wedges, and the like, none of which are shown, may also be employed in place of the grooves 32 and 34 to retain the foundation 30 on bars 26 and 28 and the end walls 12 and 14.

As can be best seen from FIGS. 1 and 3, the grooves 32 each extend between an associated set of sockets 16 so as to be in a plane substantially parallel to the side walls 18 and 20. Although the sockets 16 are illustrated as extending completely through the associated end walls 12 and 14, it is to be understood that such sockets 16 may extend only part of the way through the end walls 12, 14 if desired.

At least one of the end walls 12, 14 can be constructed in the manner as illustrated for end wall 12 so as to include a main portion 36 and removable mating parallel strips 38 and 40 disposed bracketing main portion 36. Strips 38 and 40 are provided with recesses which cooperate with an adjacent edge of the main portion 36 to form the sockets 16.

It will be appreciated that the pins 24 can be employed to retain the strips 38 and 40 on the main portion 36.

A bottom wall 42 is advantageously provided in a manner consistent with the provision of such bottom walls on honey supers.

As can be readily appreciated from the above description and from the drawing, a honey super according to the present invention provides a flexible yet simple, rugged, and inexpensive construction which permits the comb frames to be disposed either integral with the framework of the super or readily removable from the super in the conventional manner. When the sockets 16 are completely through the end walls 12 and 14, the bars 26 and 28 can be pushed through the end walls without having to disassemble the framework of the super. Further, the construction of end wall 12 as shown in the drawings permits rapid opening of the sockets, whether the sockets be completely through the end walls as illustrated or merely part of the way through, in order to facilitate insertion into and removal from the sockets of the bars 26 and 28.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A honey super, comprising, in combination:
   (a) a pair of opposing end walls each provided with a set of two sockets each one of a set being disposed directly opposite the corresponding socket provided in the other of the end wall;
   (b) a pair of side walls connected to and extending between the end walls;
   (c) a pair of bars disposed in the sockets for partially forming a comb frame disposed in the honey super; and
   (d) a comb foundation attached to the bar and to the end walls of the super, the end walls partially forming the comb frame, each set of two sockets being disposed in a plane substantially parallel to the side walls; and one of the pair of bars being a top bar and the other of the bars being a bottom bar, the bars being disposed in the sockets and attached to the foundation for supporting same, there being a plurality of sets of sockets provided in each of the end walls, and a plurality of top and bottom bars and comb foundations forming a plurality of frames in conjunction with the plurality of sockets and with the end walls, each of the end wall and top and bottom bars being provided with a groove extending between the sets of sockets, the entire length of the foundation being received in the groove.

2. A structure as defined in claim 1, wherein the sockets extend completely through the end walls.

3. A structure as defined in claim 1, wherein at least one of the ends walls includes a main portion and removable, mating, parallel strips disposed bracketing the main portion, the strips being provided with recesses each cooperating with an adjacent edge of the main portion to form the sockets.

4. A structure as defined in claim 3, wherein the sockets extend completely through the end walls.

5. A honey super, comprising, in combination:
   (a) a pair of opposing end walls each provided with a set of two sockets each one of a set being disposed directed opposite the corresponding socket provided in the other of the end wall;
   (b) a pair of side walls connected to and extending between the end walls;
   (c) a pair of bars disposed in the sockets for partially forming a comb frame disposed in the honey super; and
   (d) a comb foundation attached to the bar and to the end walls of the super, the end walls partially forming the comb frame, each set of two sockets being disposed in a plane substantially parallel to the side walls; and one of the pair of bars being a top bar and the other of the bars being a bottom bar, the bars being disposed in the sockets and attached to the foundation for supporting same, each of the end walls being provided with a groove extending from the associated socket in a direction substantially planar to the side walls, the entire length of the foundation being received in the groove.

6. A structure as defined in claim 5, wherein the sockets extend completely through the end walls.

7. A honey super, comprising, in combination:
   (a) a pair of opposing end walls each provided with a set of two sockets each one of a set being disposed directed opposite the corresponding socket provided in the other of the end wall;
   (b) a pair of side walls connected to and extending between the end walls;

(c) a pair of bars disposed in the sockets for partially forming a comb frame disposed in the honey super; and (d) a comb foundation attached to the bar and to the end walls of the super, the end walls partially forming the comb frame, each set of two sockets being disposed in a plane substantially parallel to the side walls; and one of the pair of bars being a top bar and the other of the bars being a bottom bar, the bars being disposed in the sockets and attached to the foundation for supporting same, at least one of the end walls including a main portion and removable, mating, parallel strips disposed bracketing the main portion, the strips each being provided with a recess cooperating with an adjacent edge of the main portion to form the associated socket.

8. A honey super, comprising, in combination:

(a) a pair of opposing end walls each provided with a set of two sockets each one of a set being disposed directly opposite the corresponding socket provided in the other end wall;

(b) a pair of side walls connected to and extending between the end walls;

(c) a pair of bars disposed in the sockets for partially forming a comb frame disposed in the honey super; and (d) a comb foundation attached to the bar and to the end walls of the super, the end walls partially forming the comb frame, each set of two sockets extending completely through an associated end wall and disposed in a plane substantially parallel to the side walls; and one of the pair of bars being a top bar and the other of the bars being a bottom bar, the bars being disposed in the sockets and attached to the foundation for supporting same each of the end walls and top and bottom bars being provided with a groove extending between the sockets along the side walls and the extents of the bars, the foundation being slidably received in the groove.

* * * * *